Aug. 6, 1968 M. G. WILSON 3,396,304
AUTOMATIC FOCUSING SYSTEM FOR CATHODE RAY TUBES
Filed Feb. 16, 1966
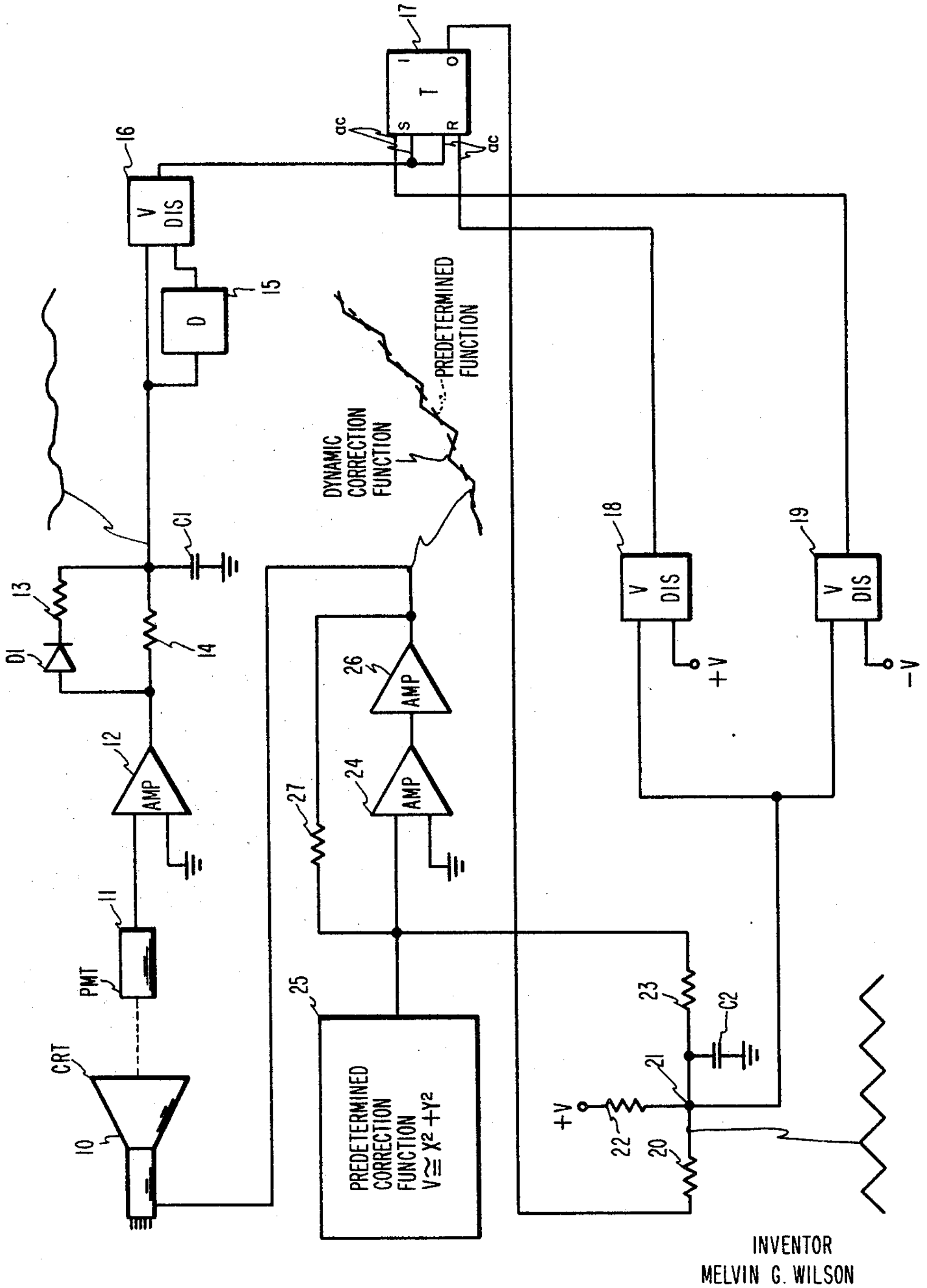
INVENTOR
MELVIN G. WILSON
BY Donald F Voss
ATTORNEY

1

3,396,304

AUTOMATIC FOCUSING SYSTEM FOR CATHODE RAY TUBES

Melvin G. Wilson, Rochester, Minn., assignor to International Business Machines Corporation, Armonk, N.Y., a corporation of New York Filed Feb. 16, 1966, Ser. No. 527,946
7 Claims. (Cl. 315—10)

This invention relates to automatic focusing apparatus for cathode ray tubes and more particularly to apparatus for dynamically adjusting the focus voltage for a cathode ray tube to keep the beam thereof constantly in focus as it is deflected about the screen of the tube.

The dynamic focusing system of this invention provides point to point or constant focusing and therefore is particularly useful in cathode ray tube scanners for character or pattern recognition machines. Of course, its usefulness is not limited to such an application and would also find utility in other types of scanner systems.

The invention takes advantage of the fact that focus of the electron beam is related to cathode ray tube "phosphor noise." When the electron beam is moved from point to point along the phosphor surface forming the screen of the cathode ray tube, a phosphor noise light signal is emitted due to the graininess or finite size of the phosphor particles. When the moving electron beam is relatively out of focus, the effect of the graininess or phosphor particle size tends to be integrated or averaged and little phosphor noise is developed. However, when the moving electron beam is in focus, the difference in phosphor sensitivity from point to point is accentuated and a relatively large phosphor noise light signal is developed. Therefore, by monitoring the change in the phosphor noise light signal, it is possible to develop an adjusting focus voltage.

Accordingly, a principal object of this invention is to provide improved apparatus for dynamically adjusting the focus voltage for a cathode ray tube to keep the beam thereof constantly in focus as it is deflected about the screen of the tube.

Another very important object of the invention is to provide dynamic focus adjusting apparatus for a cathode ray tube which monitors the change in phosphor noise and develops a corresponding focus adjusting voltage.

Still another very important object of the invention is to provide a dynamic focusing system having point to point or constant focusing adjustment for the electron beam of a cathode ray tube.

The foregoing and other objects, features and advantages of the invention will be apparent from the following more particular description of a preferred embodiment of the invention, as illustrated in the accompanying drawings.

The single figure of drawing is a schematic circuit diagram illustrating the invention.

With reference to the drawing, the invention is shown by way of example as a dynamic focusing system for the electron beam of cathode ray tube 10. The beam of cathode ray tube 10 is viewed by a suitable photomultiplier tube 11 as it is deflected from point to point on the phosphor surface of tube 10. The photomultiplier tube 11 converts the phosphor noise light signal to an electrical signal and this signal is applied to a conventional operational amplifier 12. The signal is then passed through a filtering circuit consisting of diode D1 in series with resistor 13 and both in parallel with resistor 14 and the ends of resistors 13 and 14 are connected to one side of capacitor C1, the other side thereof being connected to ground potential. The smooth or filtered amplified signal is then applied to an input of delay 15 and to an input of voltage discriminator 16 which also has an input connected to the output of delay 15. By this arrangement, it is possible to determine the algebraic sign of the time rate of change of the phosphor noise.

2

If the upper or non-delayed input to voltage discriminator 16 is more positive than the delayed input, then the time rate of change of the signal is positive and the output of the voltage discriminator 16 is also positive. A negative time rate of signal change, as measured over the time interval of the delay line 15, produces a negative discriminator output. The output of discriminator 16 is AC binary coupled to trigger 17 which is sensitive only to negative shifts of discriminator 16.

If the time rate of change of the signal is positive, thereby indicating an increase in phosphor noise and thus better focus, the state of trigger 17 is unaffected. This allows the focus voltage to continue in the same direction. Conversely, if the signal begins to decrease, the output of voltage discriminator 16 goes negative, thereby changing the state of trigger 17. The focus voltage, as it will be seen shortly, is also caused to change direction to restore better focus. Further, when the phosphor noise starts to increase, the output of discriminator 16 will switch positive. However, the state of trigger 17 will not be changed because it switches only when the output of discriminator 16 goes negative. This allows the focus voltage to continue in the same direction which tends to further improve or correct the focus.

It is thus seen that the direction of focus voltage is reversed only when the phosphor noise tends to decrease. The range of focus correction is sufficient to provide correction for the worst case. Normally, this correction voltage rarely exceeds plus or minus 3.5 volts at point 21. However, voltage discriminators 18 and 19 are provided to automatically reverse the direction of the focus voltage when the limits have been reached. Limit voltages of plus and minus 5 volts are suitable for the system shown.

The reset output of trigger 17 is applied to one end of a resistor 20 having its other end connected to point 21 in an RC integrating network. A resistor 22 having approximately the same value of resistor 23 is connected between a positive voltage and point 21. Capacitor C2 is connected between point 21 and ground potential. Resistor 23 is connected between point 21 and an input of operational amplifier 24 which has its other input connected to ground potential. The total RC of resistors 20, 22 and 23 in parallel and capacitor C2 determine the cycle time of correction swing while the value of resistor 23 determines the amount of correction.

Operational amplifier 24 also has its input connected to the output of predetermined function generator 25 which generates a theoretical correction voltage proportional to the square of the radius of deflection from the center of the screen. Theoretically, the correction voltage provided by 25 would be adequate; however, nonuniform fields and a non-flat surface require an additional dynamic focus control voltage.

The output of operational amplifier 24 is connected to the input of focus amplifier 26 which has its output fed back through resistor 27 to the input of operational amplifier 24. The output of focus amplifier 26 is also applied to the focusing coil of cathode ray tube 10.

It has been determined that the band pass of the phosphor noise signal amplifier 12 should be approximately 200 kc. to 1 mc. for scanning speeds of 5000 inches per second. The free-running cycle of the maximum focus voltage change should be about 100 microseconds. Rectification and slight integration is accomplished where the resistors 13 and 14 have values of 1K and 10K respectively and capacitor C1 has a value of approximately 0.01 $\mu$fd. The value of resistors 22 and 23 are, in this example, approximately 10K. Resistor 20 has a value of 1K and the value of capacitor C2 is 0.1 $\mu$fd.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Automatic focus correction apparatus for cathode ray tubes comprising:

means for detecting positive and negative time rate of changes of phosphor noise as the beam is deflected from point to point on the face of said cathode ray tube, focus voltage generating means for developing a bidirectional focusing voltage, and focus voltage control means responsive to negative time rate of changes in phosphor noise to cause said focus voltage generating means to change direction of said focusing voltage.

2. The apparatus of claim 1 wherein said detecting means comprises a signal delay element for delaying said phosphor noise signal, and a voltage discriminator connected to receive said phosphor noise and said delayed phosphor noise signals and providing a positive output signal when said phosphor noise signal is increasing and a negative output signal when said phosphor noise signal is decreasing.

3. The apparatus of claim 1 wherein said focus voltage control means is a bistable device connected to said detecting means so as to switch states only when said detecting means detects a negative time rate of change in phosphor noise.

4. The apparatus of claim 1 wherein said focus voltage generating means is an integrating circuit connected under control of said focus voltage control means.

5. The apparatus of claim 1 further comprising:

a pair of voltage limit detectors connected to said focus voltage generating means to detect when said bidirectional focus voltages exceed predetermined limits and connected to said focus voltage control means to cause the same to effect a change in direction of said focusing voltage by said focus voltage generating means upon said predetermined limits being exceeded.

6. The apparatus of claim 1 further comprising:

means for generating a predetermined focus control voltage, and means for combining said predetermined focus voltage with said bidirectional focusing voltage.

7. The apparatus of claim 6 wherein said combining means is an operational amplifier.

References Cited

UNITED STATES PATENTS

| | | | |
|---|---|---|---|
| 2,472,165 | 6/1949 | Mankin | 315—31 |
| 2,571,306 | 10/1951 | Szegho | 315—10 |
| 2,701,850 | 2/1955 | Blayney | 315—10 |
| 2,951,113 | 8/1960 | Farnsworth | 315—10 |
| 2,974,254 | 3/1961 | Fitzmaurice et al. | 315—10 |
| 3,333,144 | 7/1967 | Bulk | 315—10 |

RODNEY D. BENNETT, *Primary Examiner.*

H. C. WAMSLEY, *Assistant Examiner.*